(12) United States Patent
Hashimoto

(10) Patent No.: US 11,634,138 B2
(45) Date of Patent: Apr. 25, 2023

(54) ELECTRIC VEHICLE

(71) Applicant: TOYOTA JIDOSHA KABUSHIKI KAISHA, Aichi-ken (JP)

(72) Inventor: Susumu Hashimoto, Ebina (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 258 days.

(21) Appl. No.: 17/060,232

(22) Filed: Oct. 1, 2020

(65) Prior Publication Data

US 2021/0155240 A1 May 27, 2021

(30) Foreign Application Priority Data

Nov. 25, 2019 (JP) .............................. JP2019-212366

(51) Int. Cl.
*B60W 30/18* (2012.01)
*B60L 3/10* (2006.01)
(Continued)

(52) U.S. Cl.
CPC ....... *B60W 30/18127* (2013.01); *B60L 3/108* (2013.01); *B60T 1/10* (2013.01);
(Continued)

(58) Field of Classification Search
CPC ....... B60W 30/18127; B60W 30/18172; B60L 3/108; B60L 7/18; B60L 7/26; B60T 1/10; B60T 2270/602; B60T 2270/604
See application file for complete search history.

(56) References Cited

U.S. PATENT DOCUMENTS 4,962,969 A * 10/1990 Davis .................. B60W 10/184
303/3
5,472,265 A * 12/1995 Ohnuma ................... B60L 7/12
303/3
(Continued)

FOREIGN PATENT DOCUMENTS

GB 2483375 A * 3/2012 .......... B60K 7/0007
JP 05270385 A * 10/1993
(Continued)

OTHER PUBLICATIONS

Harned, J.L. et al., "Measurement of tire brake force characteristics as related to wheel slip (antilock) control design", SAE Paper 690214, SAE Transactions, 1969, vol. 78, pp. 909-925. (Year: 1969).*

(Continued)

*Primary Examiner* — David A Testardi
(74) *Attorney, Agent, or Firm* — Hauptman Ham, LLP

(57) ABSTRACT

An electric vehicle according to an example of the present application includes a battery, a regenerative brake, a friction brake, and a controller. The regenerative brake imparts regenerative braking torque to drive wheels. The friction brake imparts frictional braking torque to the drive wheels and non-drive wheels. The controller execute a slip control when the slip of the drive wheels is expected. The controller controls, during the execution of slip control, the regenerative and the friction brakes so that; the total of the frictional and the regenerative braking torque imparted to the drive wheels is less than or equal to upper limit torque set within a range that the drive wheels do not slip; the power of the regenerative power generation is not to exceed an acceptable charging power set according to a state of charge of the battery; and the regenerative braking torque is smaller than (Continued)

the regenerative braking torque before the start of the slip control.

3 Claims, 7 Drawing Sheets

(51) Int. Cl.
*B60W 10/184* (2012.01)
*B60T 1/10* (2006.01)

(52) U.S. Cl.
CPC ...... *B60W 10/184* (2013.01); *B60T 2270/602* (2013.01); *B60T 2270/604* (2013.01); *B60W 2510/083* (2013.01)

(56) References Cited

U.S. PATENT DOCUMENTS

| | | | | |
|---|---|---|---|---|
| 6,128,567 A * | 10/2000 | Suzumura | ............ | B60T 13/662 303/157 |
| 6,378,636 B1 * | 4/2002 | Worrel | ............ | B60T 17/221 180/65.25 |
| 6,687,593 B1 * | 2/2004 | Crombez | ............ | B60T 1/10 180/170 |
| 6,709,075 B1 * | 3/2004 | Crombez | ............ | B60L 15/2009 303/3 |
| 10,723,229 B1 * | 7/2020 | Yao | ............ | B60L 7/10 |
| 2002/0180266 A1 * | 12/2002 | Hara | ............ | B60W 30/18109 903/918 |
| 2006/0220453 A1 * | 10/2006 | Saito | ............ | B60W 10/184 303/152 |
| 2007/0046099 A1 * | 3/2007 | Matsuura | ............ | B60T 1/10 303/152 |
| 2008/0100132 A1 * | 5/2008 | Jeon | ............ | B60L 7/18 303/152 |
| 2010/0292882 A1 * | 11/2010 | Murata | ............ | B60W 10/08 701/22 |
| 2011/0196560 A1 * | 8/2011 | Maini | ............ | B60L 7/18 701/22 |
| 2011/0221265 A1 * | 9/2011 | Busack | ............ | B60T 8/17616 303/152 |
| 2011/0251770 A1 * | 10/2011 | Minarcin | ............ | B60W 10/08 701/70 |
| 2011/0303497 A1 * | 12/2011 | Gaffney | ............ | B60T 7/042 188/106 P |
| 2012/0133202 A1 * | 5/2012 | Mui | ............ | B60L 3/10 303/152 |
| 2013/0211644 A1 * | 8/2013 | Yokoyama | ............ | B60L 3/108 701/22 |
| 2014/0095046 A1 * | 4/2014 | Nishio | ............ | B60T 8/4872 701/81 |
| 2014/0195133 A1 * | 7/2014 | Kato | ............ | B60W 20/00 701/78 |
| 2014/0277983 A1 * | 9/2014 | Bayar | ............ | B60L 7/26 701/71 |
| 2014/0375115 A1 * | 12/2014 | Ajiro | ............ | B60T 1/10 303/152 |
| 2015/0105951 A1 * | 4/2015 | Yu | ............ | B60L 7/12 701/22 |
| 2016/0214486 A1 * | 7/2016 | Suzuki | ............ | B60L 50/52 |
| 2016/0243943 A1 * | 8/2016 | Sugai | ............ | B60L 15/2009 |
| 2016/0264002 A1 * | 9/2016 | Suda | ............ | B60T 8/17616 |
| 2019/0111790 A1 * | 4/2019 | Crombez | ............ | B60T 8/268 |
| 2020/0189398 A1 * | 6/2020 | Suzuki | ............ | B60L 3/108 |
| 2021/0086623 A1 * | 3/2021 | Yao | ............ | B60W 30/18172 |
| 2021/0122341 A1 * | 4/2021 | Okumura | ............ | B60T 8/172 |

FOREIGN PATENT DOCUMENTS

| | | | |
|---|---|---|---|
| JP | 10297462 A | * | 11/1998 |
| JP | 10322803 A | * | 12/1998 |
| JP | 200062590 A | | 2/2000 |
| JP | 2003320929 A | * | 11/2003 |
| JP | 2007196857 A | | 8/2007 |
| JP | 2011223648 A | | 11/2011 |
| JP | 2013043495 A | * | 3/2013 |
| JP | 2014184759 A | | 10/2014 |

OTHER PUBLICATIONS

F1 Technical Net forum post, "Must a tire slip to generate force?", Jan. 22, 2009, 8 pages, downloaded from: https://www.f1technical.net/forum/viewtopic.php?t=6300 (Year: 2009).*

* cited by examiner

ELECTRIC VEHICLE

CROSS-REFERENCE TO RELATED APPLICATION

The present application claims priority under 35 U.S.C. § 119 to Japanese Patent Application No. 2019-212366, filed Nov. 25, 2019. The contents of this application are incorporated herein by reference in their entirety.

BACKGROUND

Field

The present application relates to an electric vehicle including a braking device.

Background

For example, JP 2011-223648A discloses a control device for an electric vehicle performing, when braking the vehicle, regenerative cooperative control by the regenerative brake and the friction brake. In this regenerative cooperative control, regenerative braking torque is determined so that the braking torque distribution becomes smaller than the braking torque distribution in which the regeneratively braked wheels may be locked. The shortage of the regenerative braking torque for the target braking torque to be imparted to the regeneratively braked wheels is compensated by the frictional braking torque.

SUMMARY

An electric vehicle capable of braking by both a friction brake and a regenerative brake may recover more kinetic energy during deceleration, by increasing the ratio of the regenerative braking torque. Therefore, in order to reduce the operation of the friction brake, the adoption of a regenerative cooperative brake as described above, a one-pedal brake, or the like has been discussed.

However, in a two-wheel-drive electric vehicle, the regenerative braking torque is applied only to the drive wheels. If the ratio of the regenerative braking torque is simply increased, the distribution of the braking torque at the drive wheels becomes larger, thereby the wheels are likely to be locked. Further, at the time of slip control, the variation of the regenerative braking torque becomes larger. If the ratio of the regenerative braking torque is large, the regenerative power may exceed acceptable charging power of a battery in a state where the acceptable charging power of the battery is small.

An example in the present application has been devised in view of the problems described above, and an object of the example is to provide a braking device for an electric vehicle so as to effectively utilize, even during slip control, a regenerative brake in a range that does not exceed an acceptable charging power of a battery while stabilizing braking control.

An electric vehicle according to an example in the present application includes a battery, a regenerative brake, a friction brake, and a controller. The battery stores power generated by regenerative power generation of a motor generator. The regenerative brake imparts, by regenerative power generation of the motor generator, regenerative braking torque to drive wheels. The friction brake imparts, by contact friction, frictional braking torque to the drive wheels and non-drive wheels. The controller is configured to control the regenerative brake and the friction brake so that the total braking torque, which is the total of the regenerative braking torque imparted to the drive wheels and the frictional braking torque imparted to the drive and the non-drive wheels, becomes the required target braking torque. The controller is further configured to execute a slip control when the slip of the drive wheels is expected.

The controller further controls, during the execution of slip control, the regenerative brake and the friction brake as follows: The total of the frictional braking torque and the regenerative braking torque imparted to the drive wheels is controlled so as to be less than or equal to upper limit torque set within a range that the drive wheels do not slip. The power of the regenerative power generation is controlled so as not to exceed an acceptable charging power set according to a state of charge of the battery. The regenerative braking torque is controlled so as to be smaller than the regenerative braking torque before the start of the slip control.

According to the example in the present application, during the execution of the slip control, the braking torque imparted to the drive wheels is controlled to a torque that does not cause slip, while the distribution of the regenerative braking torque is determined in accordance with the acceptable charging power of the battery. Thus, while stabilizing the braking at the time of occurrence of slip, the regenerative power may be effectively utilized in a range that does not exceed the acceptable charging power of the battery.

DESCRIPTION OF EMBODIMENTS

Figure 1:
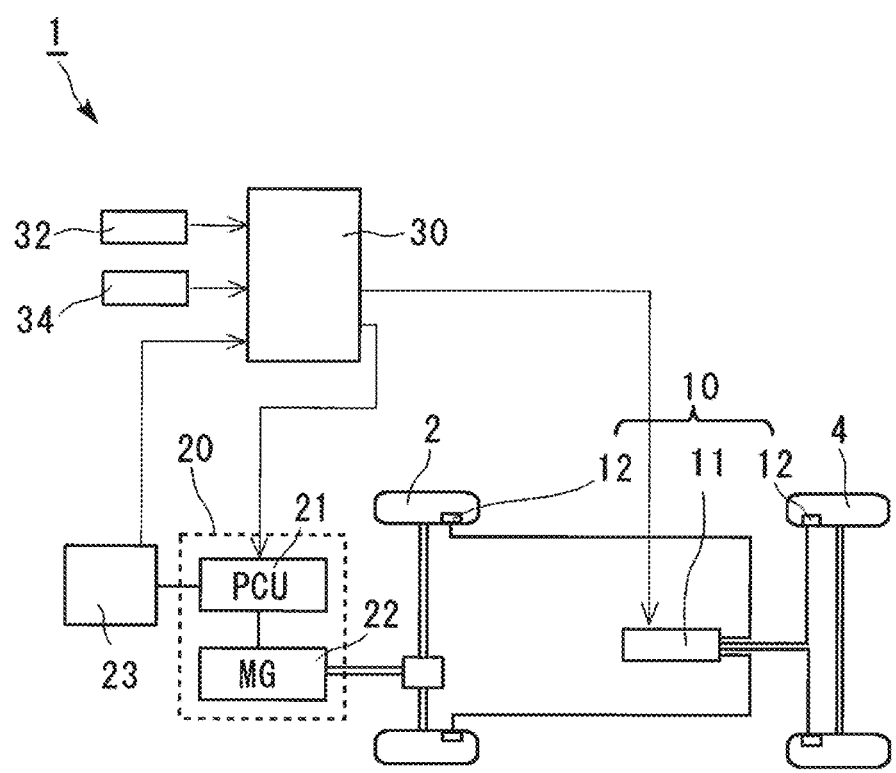
FIG. 1 is a diagram illustrating a configuration of an electric vehicle according to an embodiment in the present application.

An embodiment in the present application will be described with reference to drawings. In the drawings, parts identical or equivalent to each other are denoted by an identical reference sign, and duplicate description thereof will be simplified or omitted.

Embodiment

FIG. 1 is a diagram illustrating a configuration of a vehicle 1 according to the present embodiment. The vehicle 1 is a two-wheel-drive electric vehicle having drive wheels 2 and non-drive wheels 4. The vehicle 1 is provided with a braking device for controlling the braking of the drive wheels 2 and the non-drive wheels 4. The braking device includes a friction brake 10, a regenerative brake 20, and a controller 30.

The friction brake 10 imparts a frictional braking torque due to contact friction to the drive wheels 2 and the non-drive wheels 4 so as to make frictional braking force act on the drive wheels 2 and the non-drive wheels 4. The friction brake 10 includes a brake actuator 11, a brake rotor (not shown) and a brake caliper 12 installed on each of the drive wheels 2 and the non-drive wheels 4. The brake actuator 11, based on a control signal from the controller 30, by adjusting the hydraulic pressure supplied to the brake caliper 12, adjusts the frictional braking torque imparted to each of the drive wheels 2 and the non-drive wheels 4. However, the friction brake 10 is not limited to a hydraulic type, and may be an electric type friction brake that causes contact friction by pressing a brake pad against the brake rotor by electric power.

The regenerative brake 20 includes a power control unit (hereinafter also referred to as "PCU") 21 and a motor generator (hereinafter also referred to as "MG") 22. PCU21 is connected to a battery 23. When the power of the battery 23 is supplied to MG22 through PCU21, MG22 functions as a motor that generates a rotational driving force. During braking, when the rotational force is applied from the drive wheels 2, MG22 functions as a generator, and the generated power is charged in the battery 23 through PCU21. The regenerative brake 20, when MG22 functions as the generator to generate regenerative power, imparts a power generating load to the drive wheels 2 as regenerative braking torque to make the regenerative braking force act on the drive wheels 2.

Various sensors including a wheel speed sensor 32 for detecting wheel speed Vd of the drive wheels 2 and a vehicle speed sensor 34 for detecting vehicle speed V of the vehicle 1 is connected to the controller 30. The controller 30 acquires information relating to the driving state including the braking state based on the signals from the various sensors. The controller 30 is connected to PCU21 and the brake actuator 11. The controller 30 controls, by controlling PCU 21 and the brake actuator 11, the braking force on the drive wheels 2 and the non-drive wheels 4.

The controller 30 is also connected to the battery 23 to acquire information about the status of the battery, including SOC (State Of Charge) of the battery 23, the battery temperature, or the like. The controller 30 calculates, based on the acquired information about the state of the battery 23, a battery-input upper limit (i.e., acceptable charging power) that is an upper limit of the power capable of being input to the battery 23. For example, under conditions where the battery temperature is the same, the battery-input upper limit is smaller for higher SOC than for lower SOC. Also, if the battery temperature is higher than a predetermined value or lower than a predetermined value, the battery-input upper limit is limited to a small value. The specific relationship between SOC, the battery temperature, and the battery-input upper limit varies depending on the battery type (Ni or Li, etc.), and is set for each vehicle. The controller 30 stores a map or the like that defines the relationship between SOC and the battery temperature and the battery-input upper limit. When a Li battery is used as the battery 23, a restriction on the battery-input upper limit to prevent degradation peculiar to Li battery may be set separately. In this case, for example, the battery-input upper limit may be set, when the time integral value of charging current to the battery 23 exceeds a predetermined value, in proportion to the charging current.

The controller 30 is shown as one unit in FIG. 1. However, the controller 30 may be constituted by a plurality of units such as an integrated controller, a motor controller, and a brake controller.

When braking the vehicle 1, the controller 30 calculates target braking torque to be applied to the wheels (i.e., the driving wheels 2 and the non-driving wheels 4). The target braking torque is calculated based on operation amount of a brake pedal detected by a brake pedal stroke sensor or a parameter indicating a state related to braking such as regulator pressure. The controller 30 determines the distribution of the regenerative braking torque imparted by the regenerative brake 20 and the frictional braking torque imparted by the friction brake 10. The distribution is determined so that the target braking torque is achieved by the regenerative braking torque and the frictional braking torque. Further, the controller 30 controls PCU21 and the brake actuator 11 based on the distribution. Thus, the braking torque required for each of the drive wheels 2 and the non-drive wheels 4 is imparted.

Further, when a wheel slip is expected to occur during braking of the vehicle 1, the controller 30 sets the target value Vt for the wheel speed Vd. Hereinafter the target value is referred to as the "target wheel speed". The controller 30 executes the slip control to determine the frictional braking torque and the regenerative braking torque in accordance with the target wheel speed Vt.

Figure 2:
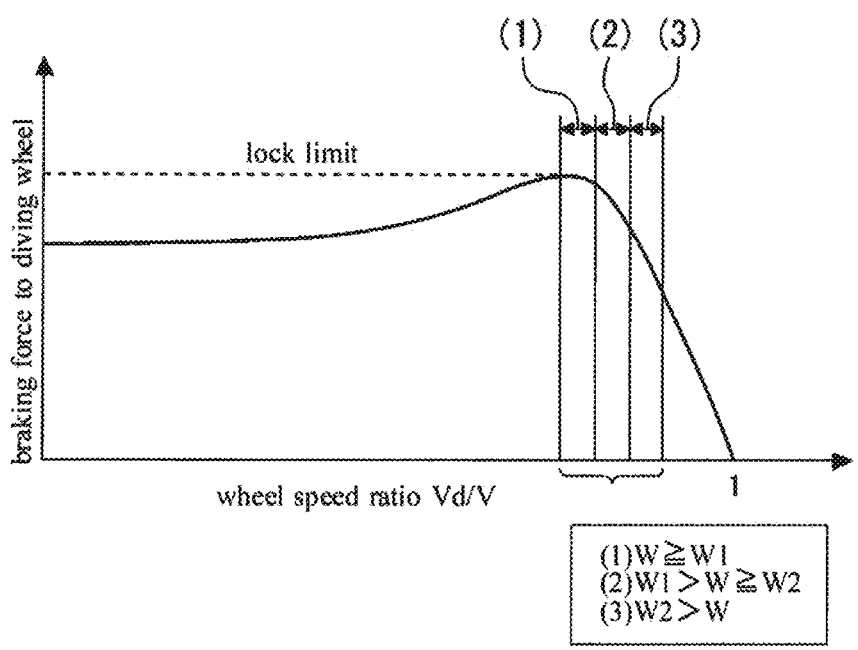
FIG. 2 is a diagram illustrating the relationship between the ratio of wheel speed to vehicle speed and braking force during a slip control according to the embodiment in the present application.

FIG. 2 illustrates the relationship between the ratio Vd/V of the wheel speed Vd of the driving wheels 2 to the vehicle speed V and the braking force on the driving wheels 2 in the slip control of the present embodiment. Hereinafter, the ratio of the wheel speed Vd of the driving wheels 2 to the vehicle speed V is referred to as the "wheel speed ratio Vd/V".

The slip control is performed in a region close to the limit value of the braking force where the drive wheels 2 are not locked. In the slip control of the present embodiment, in accordance with the size of the battery-input upper limit W, the target wheel speed Vt is set as follows:

For the battery-input upper limit W of the battery 23, two thresholds W1, W2 is set. The thresholds W1, W2 meet the relationship of W1>W2>0. Then, as shown in FIG. 2, the target wheel speed Vt is set depending on whether the battery-input upper limit W is in the following range (1) to (3). (1)W≥W1, (2)W1>W≥W2, (3)W2>W The target wheel speed Vt set here is so that the wheel speed ratio Vd/V increases in the order of the above cases (1), (2), and (3). That is, at the time of the straight driving, under the conditions of the same vehicle speed V, when the battery-input upper limit W which is the upper limit of the power that can be input to the battery 23 is small, the target wheel speed Vt is set to be relatively large, and when the battery-input upper limit W is large, the target wheel speed Vt is set to be relatively small. If the battery-input upper limit W is small, the braking torque is set so that the distribution of the regenerative braking torque of the total braking torque imparted to the drive wheels 2 is relatively small. Hereinafter, the outline of the slip control will be described for each case where the battery-input upper limit W is in the above range (1) to (3).

Figure 3:
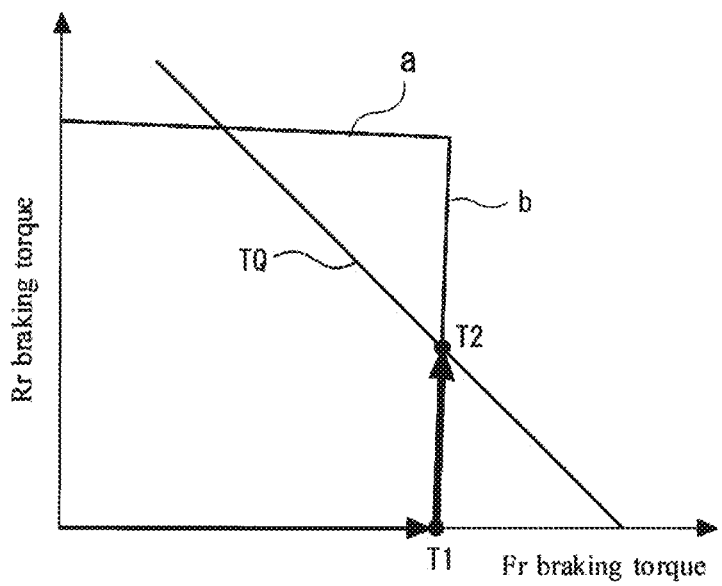
FIG. 3 is a diagram for explaining the relationship between braking torque imparted to drive wheels and braking torque imparted to non-drive wheels in the slip control according to the embodiment in the present application.
Figure 4:
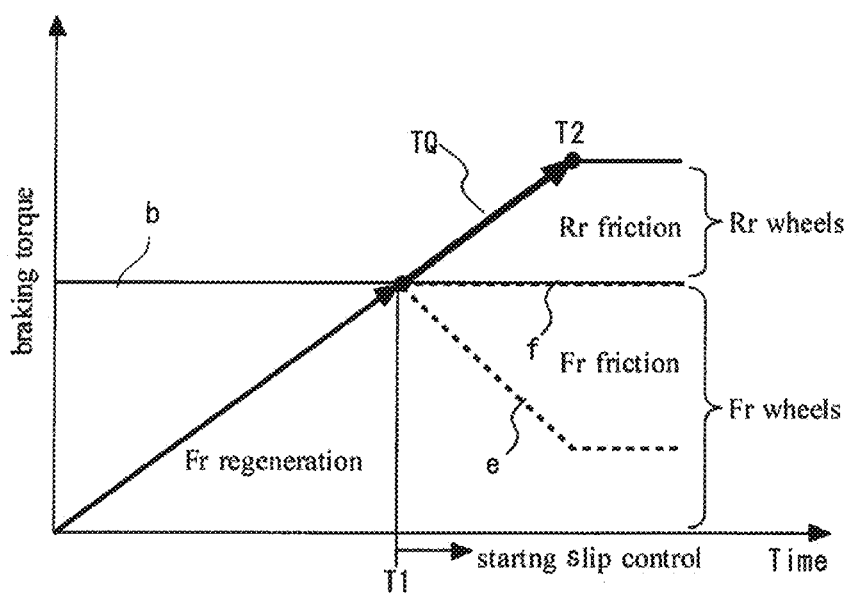
FIG. 4 is a diagram for explaining the change of the braking torque imparted to each of the drive wheels and the non-drive wheels in the slip control according to the embodiment in the present application.
Figure 5:
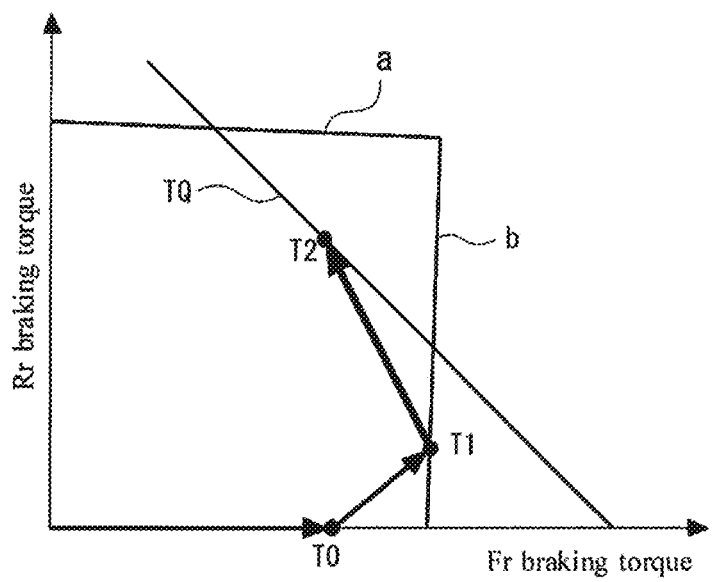
FIG. 5 is a diagram for explaining the relationship between the braking torque imparted to the drive wheels and the braking torque imparted to the non-drive wheels in the slip control according to the embodiment in the present application.
Figure 6:
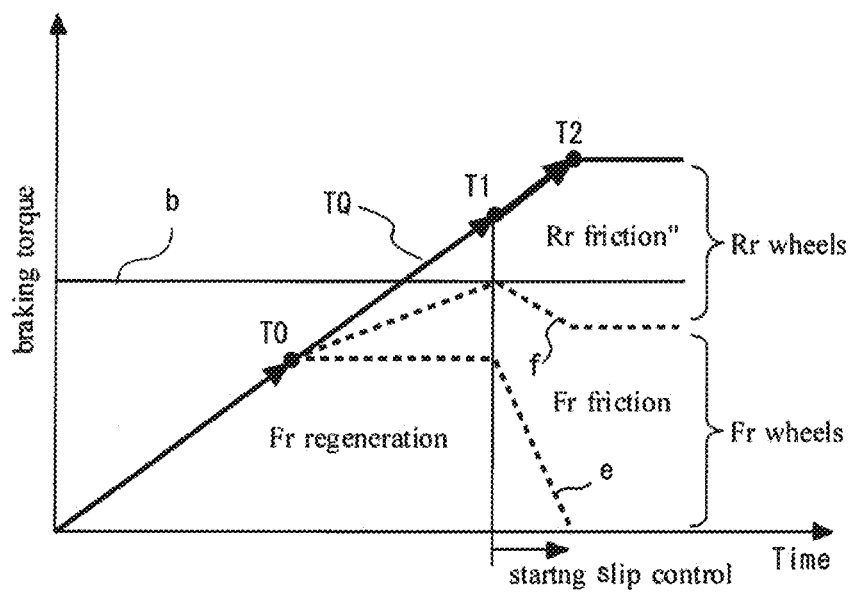
FIG. 6 is a diagram for explaining the change of the braking torque imparted to each of the drive wheels and the non-drive wheels in the slip control according to the embodiment in the present application.
Figure 7:
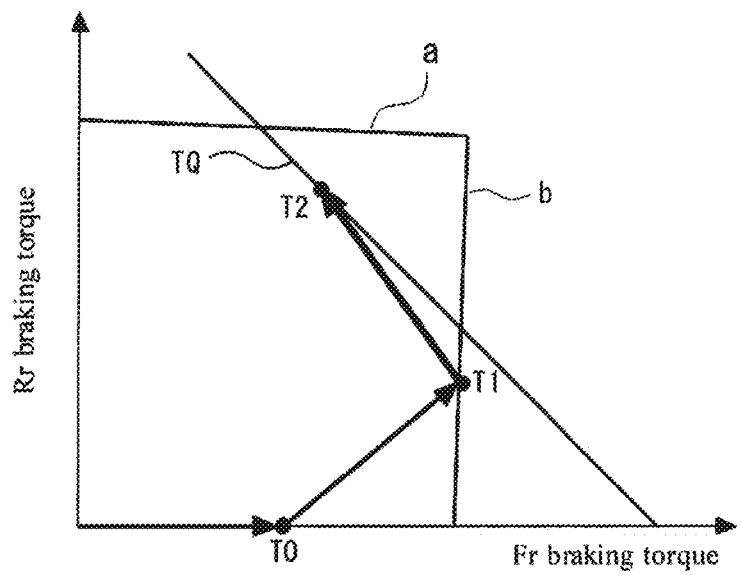
FIG. 7 is a diagram for explaining the relationship between the braking torque imparted to the drive wheels and the braking torque imparted to the non-drive wheels in the slip control according to the embodiment in the present application.
Figure 8:
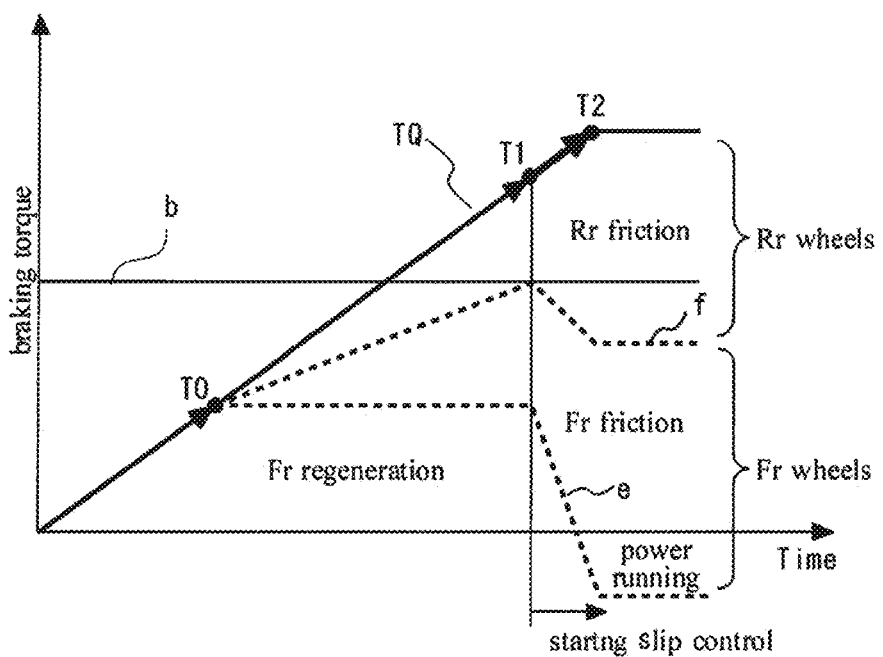
FIG. 8 is a diagram for explaining the change of the braking torque imparted to each of the drive wheels and the non-drive wheels in the slip control according to the embodiment in the present application.

FIGS. 3, 5, and 7 are diagrams illustrating the relationship between the braking torque imparted to the drive wheels 2 and the braking torque imparted to the non-drive wheels 4 in the slip control. FIGS. 4, 6, and 8 are diagrams for explaining the change of the braking torque imparted to the drive wheels 2 and the non-drive wheels 4 in the slip control. Further, FIGS. 3 and 4 illustrate the above case of (1) where the battery-input upper limit W of is the threshold W1 or more. FIGS. 5 and 6 illustrate the above case (2) where the battery-input upper limit W of is smaller than the threshold W1 and the threshold W2 or more. FIGS. 7 and 8 illustrate the above case (3) where the battery-input upper limit W is smaller than the threshold W2.

In the following description and figures, the case where the drive wheels 2 are front wheels will be described as an example. The drive wheels 2 will be described as "Fr wheels", and the non-drive wheels 4 will be described as "Rr wheels". The lock limit value of the braking force where the drive wheels 2 are not locked will be described as "Fr lock limit". Similarly, the lock limit value of the non-drive wheels 4 will be described as "Rr lock limit". The total value of the braking torque respectively imparted to the drive wheels 2 and the non-drive wheels 4 will be described as "Fr braking torque", "Rr braking torque", respectively. The frictional braking torque respectively imparted to the drive wheels 2 and the non-drive wheels 4 will be described as "Fr friction", "Rr friction", respectively. The regenerative braking torque imparted to the drive wheels 2 will be described as "Fr regeneration". In FIGS. 3-8, the solid line A denotes the Rr lock limit, the solid line B denotes the Fr lock limit, and solid line TQ denotes the target braking torque TQ, which is a target value of the total braking torque imparted to the drive wheels 2 and the non-drive wheels 4. In FIGS. 4, 6, and 8, the broken line E denotes the boundary between the Fr regeneration and Fr friction. The broken line F denotes the boundary between the Fr friction and Rr friction.

When the driving wheels 2 is controlled so as to be converge to the target wheel speed Vt in the slip control, MG22 requires to generate vibrational torque due to the effects of the elasticity of the drive shaft and the variation of the road surface μ, etc. However, for simplicity of explanation, the averaged torque per unit time of the regenerative braking torque is illustrated in FIGS. 3 to 8.

The example illustrated in FIGS. 3 and 4 is an example where the battery-input upper limit W is in the above range of (1). That is, FIGS. 3 and 4 illustrates the example where the battery-input upper limit W is a threshold W1 or more and there is the greatest margin in the power that can be input, among the cases (1) to (3). In this example, at timing T1, the regenerative braking torque imparted to the drive wheels 2 reaches the Fr lock limit (see solid line b), the slip control is started. When the slip control is started, the wheel speed Vd is lowered toward the target wheel speed Vt set in the range not exceeding the battery-input upper limit W.

After the start of the slip control, the Fr braking torque is maintained at the braking torque of the Fr lock limit (i.e., the upper limit torque). A shortage in the braking torque, that is, the difference between the Fr braking torque and the target braking torque TQ is supplemented by the Rr frictional imparted to the Rr. The operation of the friction brake 10 also imparts the Fr friction to the Fr. Fr regeneration is the torque obtained by subtracting the Fr frictional from the braking torque at the Fr lock limit. Thus, while suppressing the slip, it is possible to effectively utilize the regenerative brake.

The example illustrated in FIGS. 5 and 6 is an example where the battery-input upper limit W is in the above range (2). In this example, the input power to the battery 23 by the regenerative power generation has reached the battery-input upper limit of the battery 23 at the timing T0 before the slip occurs. Therefore, it is impossible to further increase the regenerative braking torque. Thus, after the timing T0, the difference between the target braking torque TQ and the regenerative braking torque is supplemented by the frictional braking torque. The regenerative braking torque is maintained at a value that does not exceed the battery-input upper limit, i.e., the regenerative braking torque at timing T0.

Thereafter, when the slip control is started at the timing T1 when the Fr braking torque reaches the Fr lock limit, the wheel speed Vd is lowered toward the target wheel speed Vt. The target wheel speed Vt is set so that the wheel speed ratio Vt/V becomes larger than that of the case (1).

During the slip control, in order to control the drive wheels so as to converge to the target wheel speed Vt, MG22 requires to increase or decrease the input and output of MG22. Therefore, the target wheel speed Vt needs to be set so that the time-averaged regenerative braking torque does not exceed the battery-input upper limit. In the example of FIGS. 5 and 6, the time-averaged regenerative braking torque is set to be substantially zero. The regenerative braking torque gradually decreases so as to converge the wheel speed Vd to the target wheel speed Vt. Then, the regenerative braking torque becomes almost zero at the timing T2. Consequently, it is possible to stabilize the braking without being affected by the battery-input upper limit and to prevent further progress of the input limit of the battery.

The example shown in FIGS. 7 and 8 is an example where the battery-input upper limit W is in the above range (3). In this example, the battery-input upper limit W is less than the threshold W2 and, at the timing T0 before the slip occurs, the input to the battery 23 by the regenerative power generation exceeds the battery-input upper limit of the battery 23. Therefore, at the timing T0, the regenerative braking torque is maintained constant and the application of the frictional braking torque is started.

At the timing T1 when the Fr braking torque reaches the Fr lock limit, the slip control is started and the target wheel speed Vt is set so that the wheel speed ratio Vt/V is larger than that in the above case (2). After starting of the slip control, the frictional braking torque is increased and the regenerative braking torque is reduced, finally, MG22 performs the power running operation. Thus, the surplus of the frictional braking torque with respect to the target braking torque TQ is absorbed. Thus, as the driving wheels 2 converge to the target wheel speed Vt, it is possible to greatly vary the input and output of MG22, it is possible to stably secure the braking force without being affected by the limitation of the battery input quantity.

Figure 9:
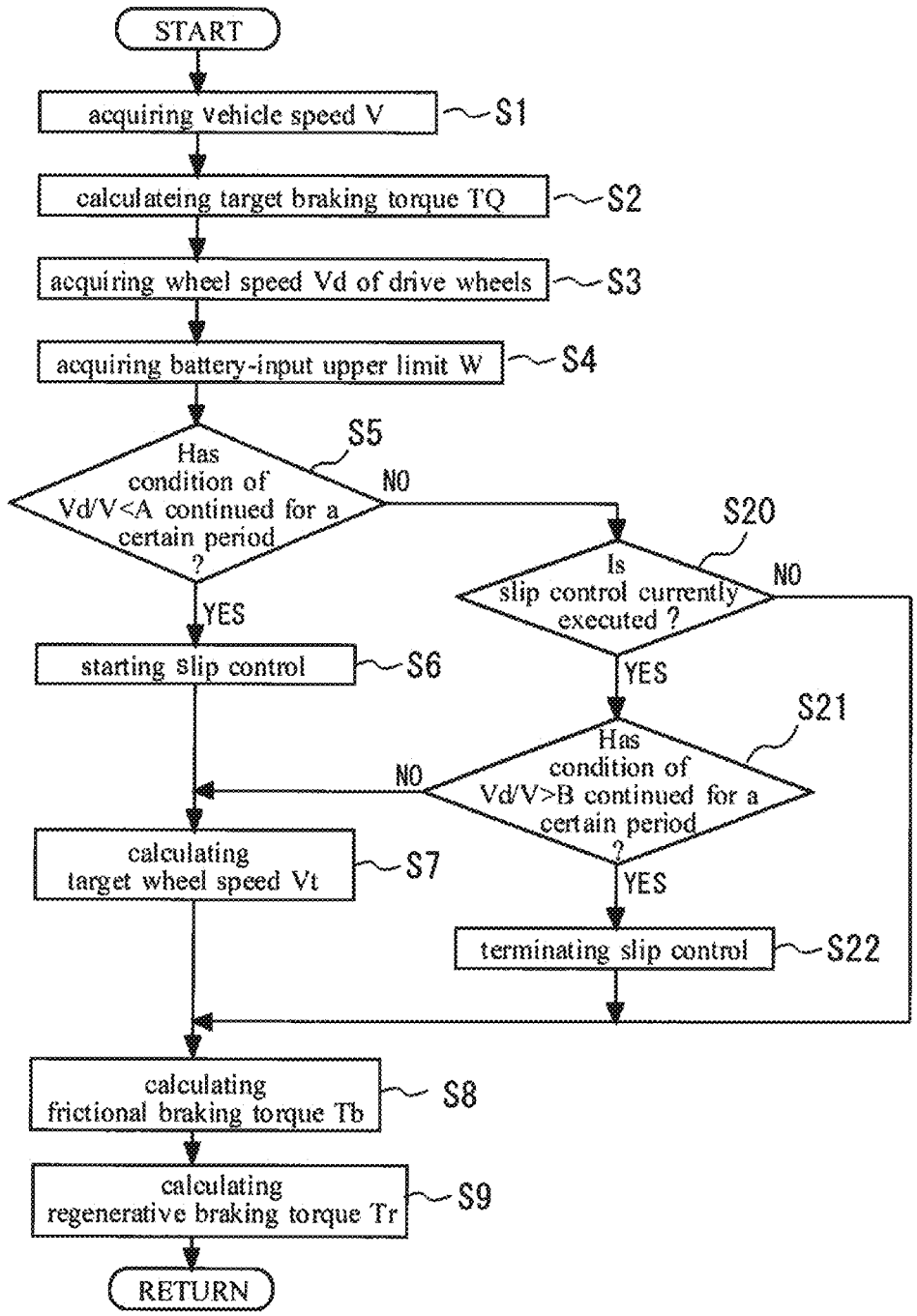
FIG. 9 is a flowchart illustrating a control routine of the slip control according to the embodiment in the present application.

Hereinafter, with reference to FIG. 9, the slip control will be described. FIG. 9 is a flowchart illustrating an example of a specific control routine of the slip control performed by the controller 30. The routine of FIG. 9 is performed when a braking request is detected.

When the routine of FIG. 9 is started, first, in step S1, the vehicle speed V is acquired. Vehicle speed V is acquired based on the output of the vehicle speed sensor 34.

Next, the process proceeds to step S2, and the target braking torque TQ is calculated. The target braking torque TQ is a target value of the sum of the braking torque that the regenerative brake 20 and the friction brake 10 impart to the wheels for generating the required braking force to the drive wheels 2 and the non-drive wheels 4.

Next, the process proceeds to step S3, and the wheel speed Vd of the drive wheels 2 is acquired. Wheel speed Vd of the drive wheel 2 is acquired based on the output of the wheel speed sensor 32. Next, the process proceeds to step S4, and the battery-input upper limit W of the battery 23 is acquired.

Next, in step S5, it is determined whether or not a condition in which the wheel speed ratio Vd/V is smaller than a reference value A has been detected continuously for a certain period of time. The wheel speed ratio Vd/V is a parameter for estimating the slipping state. If the wheel speed ratio Vd/V is small, it can be determined that the vehicle is in the slipping state. The reference value A to be compared with the wheel speed ratio Vd/V and the certain period of time are preset thresholds to determine whether the vehicle 1 is slipped or not.

In step S5, if it is determined that the condition in which the wheel speed ratio Vd/V is smaller than the reference value A continues for a certain period of time, it is predicted that the vehicle will be in the slipping state, so that the process proceeds to step S6 and the slip control is started.

When the slip control is started, in the following step S7, the target wheel speed Vt is set in accordance with the battery-input upper limit W of the battery 23 acquired in step S4. As described above, the target wheel speed Vt is set so that the wheel speed ratio Vd/V becomes larger as the battery-input upper limit W is in a small range in accordance with the range to which the battery-input upper limit W belongs.

Next, the process proceeds to step S8, and the frictional braking torque Tb is calculated. The frictional braking torque Tb is calculated according to the target wheel speed Vt and the target braking torque. Next, the process proceeds to step S9, and the regenerative braking torque Tr is calculated. The regenerative braking torque Tr is calculated so as to converge the wheel speed Vd of the driving wheels 2 to the target wheel speed Vt. Thereafter, the current routine is terminated.

In step S5, if it is determined that the condition in which the wheel speed ratio Vd/V is smaller than the reference value A does not continue for a certain period of time, then the process proceeds to step S20. In step S20, it is determined whether or not the slip control is currently executed.

When the result of the determination is in execution of the slip control, the process proceeds to step S21, and it is determined whether or not a condition in which the wheel speed ratio Vd/V is larger than the reference value B continues for a certain period of time. The certain period of time here is a reference time set to determine the completion of the slip control, and a time different from the certain period of time used in the determination of step S5. The reference value B is a reference value set in advance to determine that the vehicle 1 is not in the slipping state, at least, a value greater than the reference value A used in step S5.

As a result of the determination in step S21, when it is determined that the condition in which the wheel speed ratio Vd/V is larger than the reference value B does not continue for the certain period of time, the process proceeds to step S7. In Step 7, the slip control is continued, and the target wheel speed Vt of the driving wheels 2 is calculated based on the battery-input upper limit W.

When it is determined that the condition in which the wheel speed ratio Vd/V is larger than the reference value B continues for the certain period of time, it is expected that the slipping state to have been eliminated. Therefore, the process proceeds to step S22, and the present slip control is terminated. Thereafter, the brake control is returned to a normal control and the process proceeds to step S8. In step 8, the frictional braking torque Tb is calculated based on the target wheel speed Vt calculated according to the normal control routine. In step S9, the regenerative braking torque Tr is calculated. Thereafter, the current routine is terminated.

Figure 10:
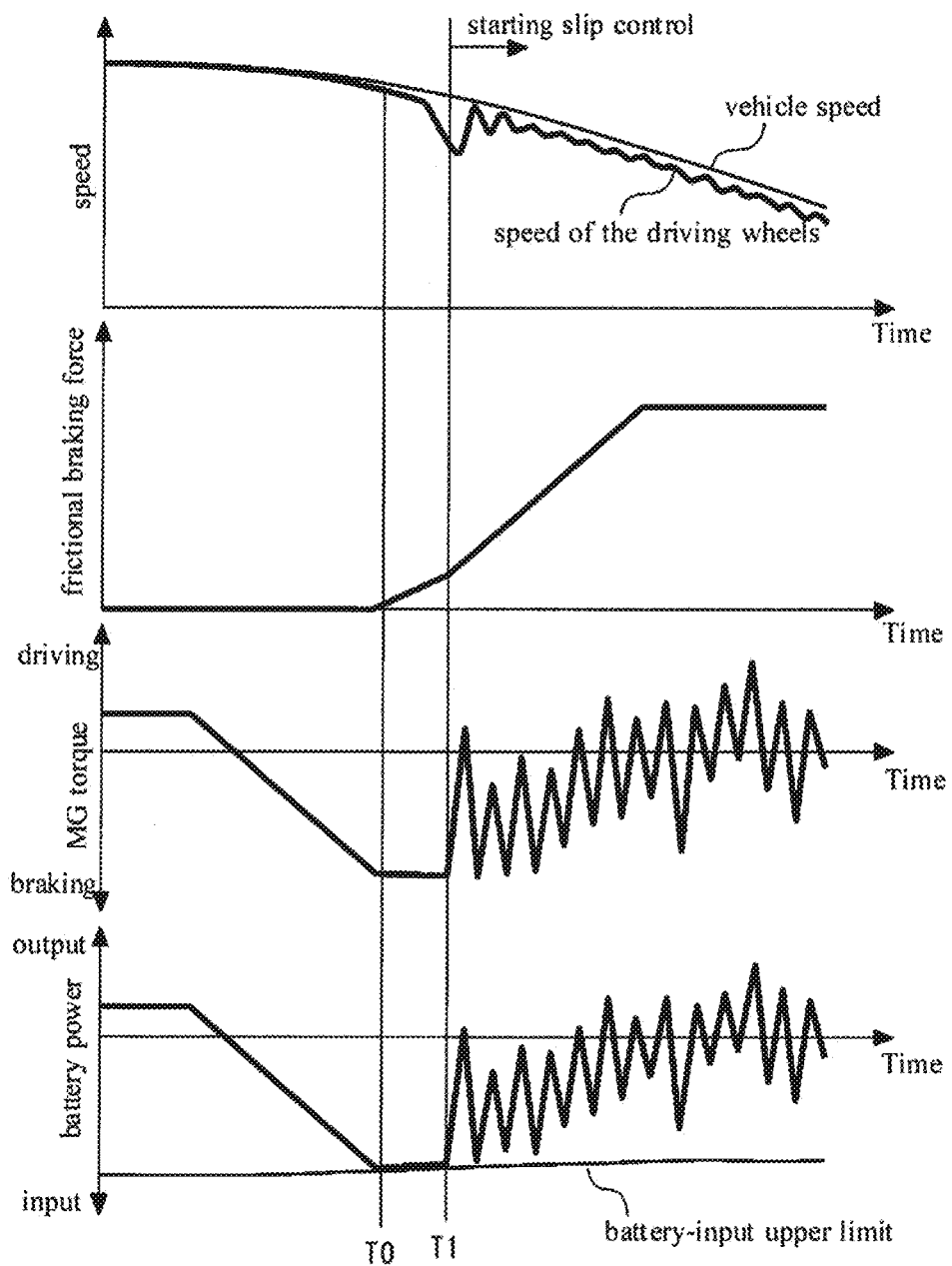
FIG. 10 is a timing chart of the slip control according to the embodiment in the present application.

FIG. 10 is a timing chart of the slip control of the present embodiment. FIG. 10 illustrates an example in the case where the battery-input upper limit is smaller than the threshold value W2. In the example of FIG. 10, the battery power reaches the battery-input upper limit at timing T0, MG torque which is the regenerative braking torque is held at a constant value, the frictional braking force by the friction brake 10 also acts on the wheels. Then slip control is started at the timing T1. When the slip control is started, the target wheel speed Vt is set according to the battery-input upper limit W. The frictional braking torque Tb is set according to the target wheel speed Vt and the target braking torque TQ, and the frictional braking force on the driving wheels 2 and the non-driving wheels 4 is increased.

In addition, when the wheel speed of the driving wheels 2 converges to the target wheel speed Vt during the slip control, MG22 needs to generate vibrational torques due to affects such as the elasticity of the drive shaft and variations in road surface μ. Therefore, the target wheel speed Vt is set so that the time-averaged regenerative braking torque generated by MG22 is small with respect to the input limitation of the battery. Thus, MG torque (i.e., the regenerative braking torque) is maintained in a range that does not exceed the battery-input upper limit including the vibration of the battery power, as a whole, it is possible to control the braking force stably.

What is claimed is:

1. An electric vehicle comprising:
    a regenerative brake for imparting a regenerative braking torque to drive wheels by a regenerative power generation of a motor generator,
    a battery capable of storing power generated by the regenerative power generation by the motor generator,
    a friction brake for imparting a frictional braking torque by contact friction to the drive wheels and non-drive wheels, and
    a controller configured:
        to control the regenerative brake and the friction brake so that a total braking torque, which is a sum of the regenerative braking torque imparted to the drive wheels and the frictional braking torque imparted to the drive wheels and the non-drive wheels, becomes a target braking torque during braking,
        to perform a slip control when a ratio of wheel speed of the drive wheels to a speed of the electric vehicle is smaller than a reference value,
        to control the regenerative brake and the friction brake, during performing the slip control, such that a sum of the frictional braking torque and the regenerative braking torque imparted to the drive wheels is equal to or less than an upper limit torque set to prevent slipping of the drive wheels, and the total braking torque becomes the target braking torque, and wherein the regenerative braking torque in the slip control is set such that a distribution of the regenerative braking torque in the total braking torque when an acceptable charging power of the battery is respectively small is smaller than that when the acceptable charging power of the battery is respectively large, wherein the controller is configured to set a target wheel speed of the drive wheels such that the ratio of wheel speed of the drive wheels to speed of the electric vehicle is within a first range when the acceptable charging power of the battery is larger than a first threshold value, the ratio of wheel speed of the drive wheels to speed of the electric vehicle is within a second range, which is larger than the first range, when the acceptable charging power of the battery is in the range between the first threshold value and a second threshold value which is smaller than the first threshold value, and the ratio of wheel speed of the drive wheels to speed of the electric vehicle is within a third range, which is larger than the second range, when the acceptable charging power of the battery is in the range smaller than the second threshold value.

2. The electric vehicle according to claim 1, wherein the controller is configured to impart, when performing the slip control and when the acceptable charging power is less than a threshold value, torque corresponding to how much greater the frictional braking torque is than the target braking torque to the drive wheels provided by a power running operation of the motor generator.

3. The electric vehicle according to claim 1, wherein the controller is configured to set, if the regenerative power generation exceeds the acceptable charging power at a time at which the slip control starts, the regenerative braking torque so that a time-averaged regenerative braking torque generated by the power by the regenerative power generation becomes zero torque.

* * * * *